US006985471B1

(12) United States Patent
Holma et al.

(10) Patent No.: US 6,985,471 B1
(45) Date of Patent: Jan. 10, 2006

(54) DATA TRANSMISSION METHOD, RADIO NETWORK SUBSYSTEM, AND USER EQUIPMENT

(75) Inventors: Harri Holma, Helsinki (FI); Antti Toskala, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/744,015

(22) PCT Filed: Jul. 21, 1999

(86) PCT No.: PCT/FI99/00635

§ 371 (c)(1),
(2), (4) Date: Mar. 27, 2001

(87) PCT Pub. No.: WO00/05829

PCT Pub. Date: Feb. 3, 2000

(30) Foreign Application Priority Data

Jul. 22, 1998 (FI) ...................................... 981649

(51) Int. Cl.
*H04B 7/216* (2006.01)
(52) U.S. Cl. ...................... 370/342; 370/335; 370/441
(58) Field of Classification Search ................ 370/329, 370/320, 331, 335, 342, 441, 468, 524, 318, 370/328, 332, 341; 455/455; 375/130, 140, 375/146
See application file for complete search history.

(56) References Cited

U.S. PATENT DOCUMENTS

| 5,377,194 | A | * | 12/1994 | Calderbank ................. 370/524 |
| 5,442,625 | A | | 8/1995 | Gitlin et al. |
| 5,515,396 | A | | 5/1996 | Dalekotzin |
| 5,533,012 | A | * | 7/1996 | Fukasawa et al. .......... 370/342 |
| 5,956,332 | A | * | 9/1999 | Rasanen et al. ............ 370/342 |
| 6,052,385 | A | * | 4/2000 | Kanerva et al. ............ 370/468 |
| 6,075,792 | A | * | 6/2000 | Ozluturk ..................... 370/441 |
| 6,108,369 | A | * | 8/2000 | Ovesjo et al. .............. 375/146 |
| 6,181,683 | B1 | * | 1/2001 | Chevillat et al. ........... 370/329 |
| 6,215,778 | B1 | * | 4/2001 | Lomp et al. ................ 370/335 |
| 6,222,875 | B1 | * | 4/2001 | Dahlman et al. ........... 375/130 |
| 6,356,555 | B1 | * | 3/2002 | Rakib et al. ................ 370/441 |
| 6,377,809 | B1 | * | 4/2002 | Rezaiifar et al. ........... 455/455 |
| 6,393,047 | B1 | * | 5/2002 | Popovic' .................... 375/140 |
| 6,567,389 | B1 | * | 5/2003 | Honkasalo et al. ......... 370/342 |

FOREIGN PATENT DOCUMENTS

| EP | 0 693 834 A1 | 1/1996 |
| EP | 0693834 | 1/1996 |
| EP | 0 810 742 A2 | 3/1997 |

(Continued)

OTHER PUBLICATIONS

"The ETSI UMTS Terrestrial Radio Access (UTRA) ITU-R RTT Candidate Submission" (Tdoc SMG2 260/98 May/Jun. 1998).

*Primary Examiner*—Phirin Sam
(74) *Attorney, Agent, or Firm*—Pillsbury Winthrop Shaw Pittman LLP

(57) ABSTRACT

The invention relates to a method for transmitting data from a radio network subsystem over a radio link to user equipment in a mobile telephone system, a radio network subsystem, and user equipment. The radio network subsystem transmits a dedicated physical channel to the user equipment. The dedicated physical channel comprises a dedicated physical control channel and a dedicated physical data channel. The dedicated physical channel is formed by frames to be transmitted to the radio link. During transmission, the radio network subsystem spreads each channel with a spreading code, the length of which spreading code, i.e. spreading factor, determines the data transmission rate.

19 Claims, 11 Drawing Sheets

FOREIGN PATENT DOCUMENTS

| | | |
|---|---|---|
| EP | 0 797 369 A2 | 9/1997 |
| EP | 0797369 | 9/1997 |
| FI | 981649 | 1/2000 |
| JP | 11041140 | 2/1999 |
| WO | WO 95/12259 | 5/1995 |
| WO | WO 95/23464 | 8/1995 |
| WO | WO 96/05669 | 2/1996 |
| WO | WO 9605669 A1 | 2/1996 |

* cited by examiner

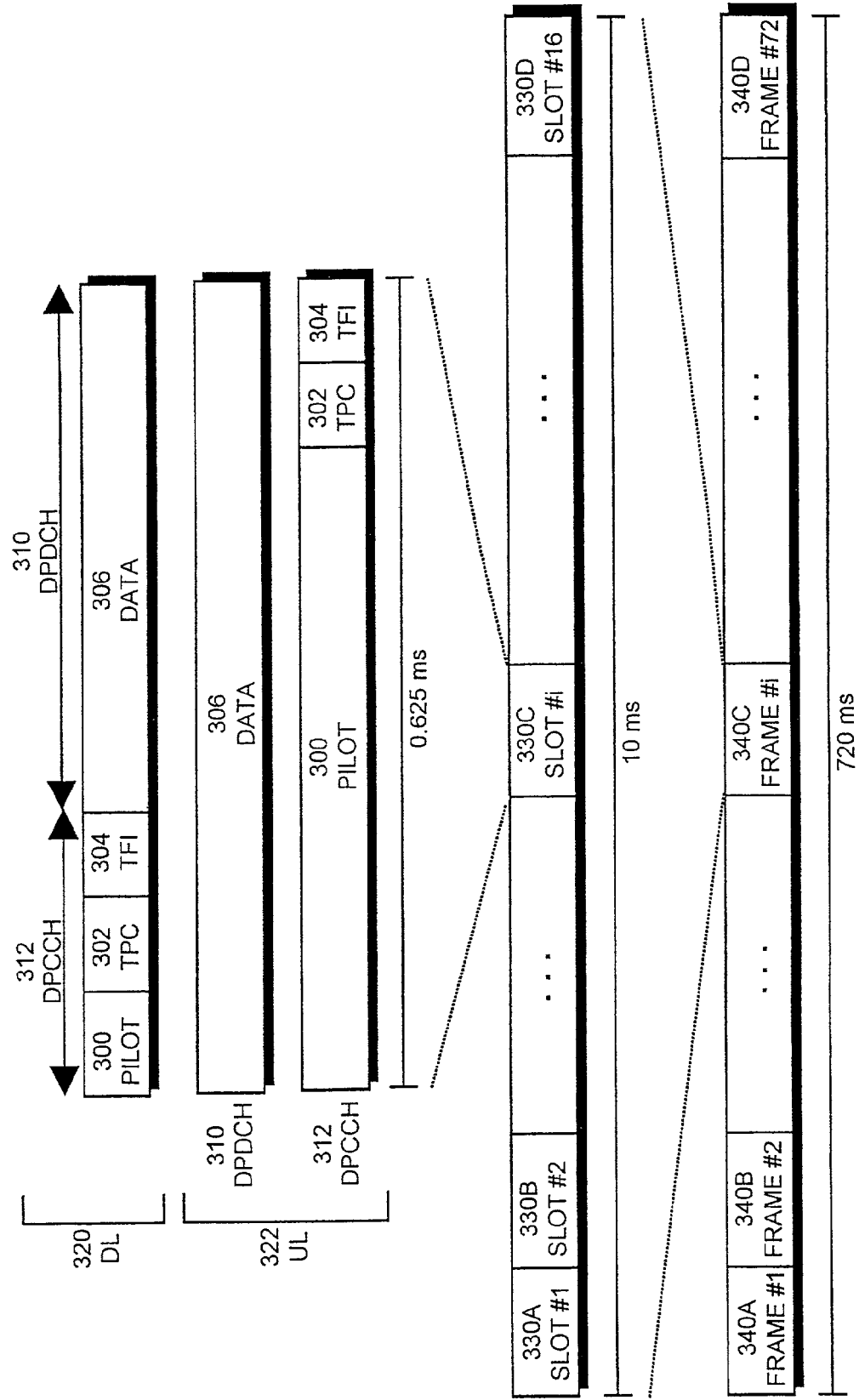

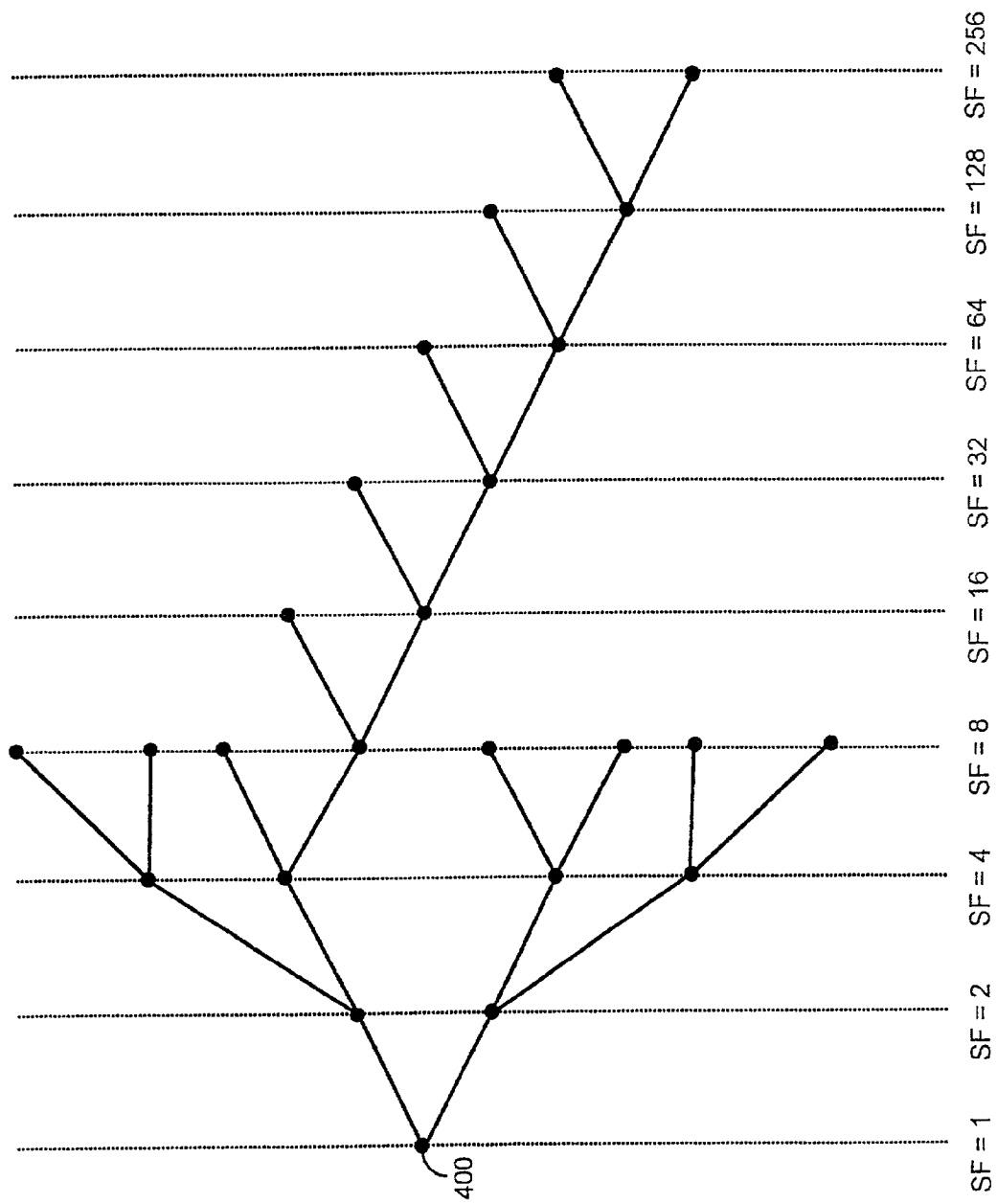

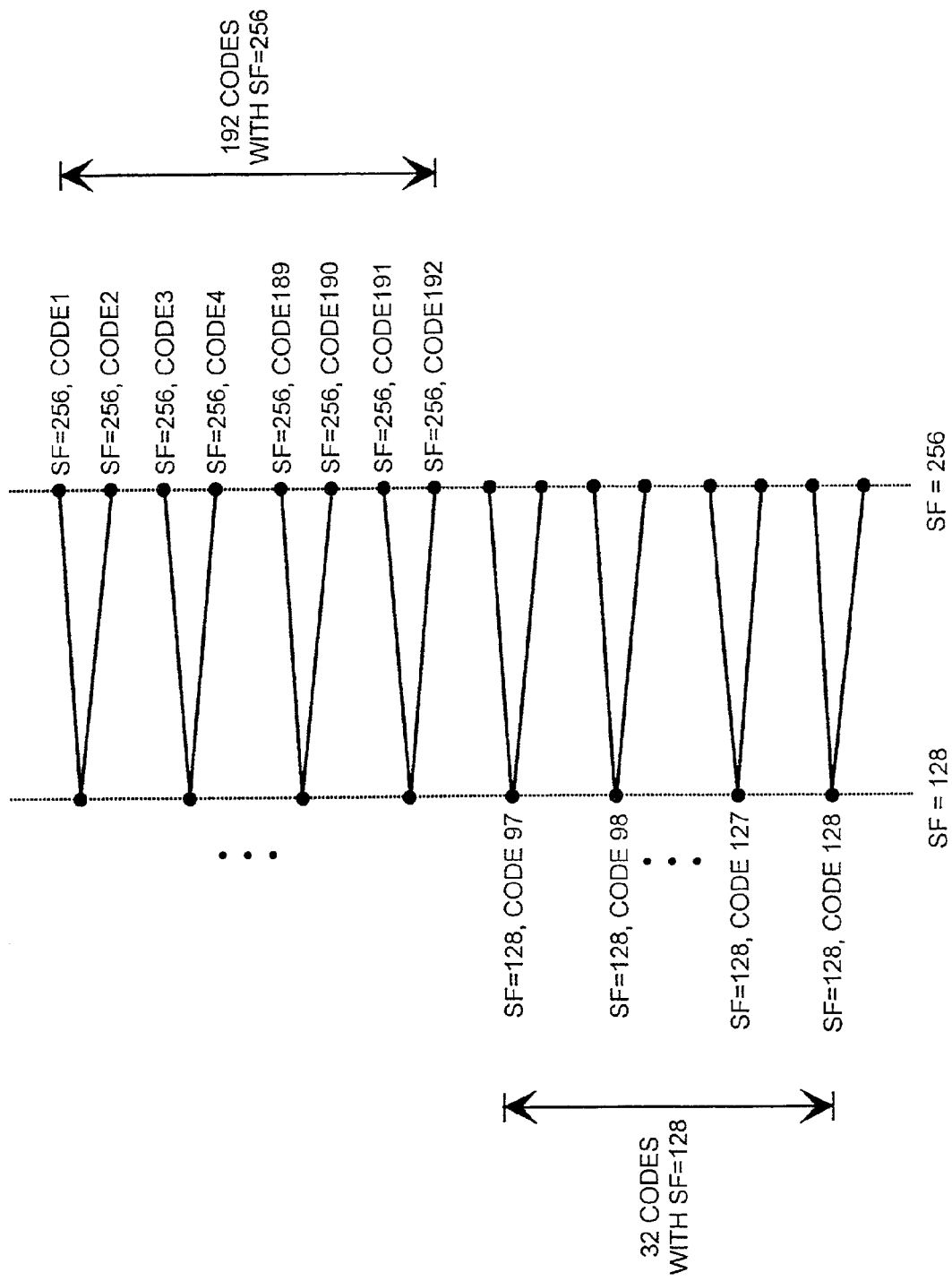

DATA TRANSMISSION METHOD, RADIO NETWORK SUBSYSTEM, AND USER EQUIPMENT

This application is the national phase of international application PCT/F199/00635 filed Jul. 21, 1999 which designated the U.S. and the international application was published under PCT Article 21(2) in English.

FIELD OF THE INVENTION

The invention relates to a method for transmitting data from a radio network subsystem to user equipment in a mobile telephone system. In particular, the invention relates to the use of spreading codes in a universal mobile telephone system.

BACKGROUND OF THE INVENTION

One of the biggest problems in mobile telephone systems is an efficient use of a limited radio resource. In present systems, a certain quantity of resources, for instance one spreading code, is reserved for each user for a circuit switched call during the entire radio link. The problem occurs, because not only is user data continuously transmitted, but system control data must also be transmitted at sporadically or regularly repeating intervals. Another problem relates to the operation of user equipment in slotted mode, in which the user equipment measures the received power of other frequencies of adjacent base transceiver stations for part of the duration of the radio frame. In this case, the user equipment cannot receive normally, but may even loose the entire radio frame.

For instance, in systems using the code division multiple access method (CDMA) one spreading code with spreading factor 256 is reserved for each connection on a downlink from the radio network subsystem to the user equipment. This spreading factor is enough to transmit user data, but when it is necessary to transmit control data, coding must be cut down too much. One solution to the problem is to replace user data with system control data, but in this case some of the user data would be lost, and when transmitting speech, for instance, this would be noticeable as a decrease in speech quality, even breaking.

Another solution to the first problem is to reserve data transmission resources in a manner that there is enough of them all the time. In this case, a spreading code with spreading factor 128, for instance, is reserved for the connection. A problem occurs, however, because the need for transmission resources is calculated on the basis of the momentary maximum required and thus transmission resources are wasted during most of the time when control data need not be transmitted. In theory, it is possible to use 128 different spreading codes simultaneously, but, as in certain cases even 25 to 30% of users are performing soft handovers at the same time, there are, in practice, less than a hundred spreading codes left to use.

Used spreading codes can be arranged in a code tree in which the spreading codes used in the system are arranged mutually orthogonally. When moving deeper into the tree, the length of the spreading codes doubles on each level, thus halving the data transmission speed. One suggested solution to the second problem above is that adjacent spreading codes on one level, i.e. sibling codes, be reserved for two different users. The spreading factor of the sibling codes can be 256, for instance. When necessary, one of the users can then obtain the parent code of said spreading codes, i.e. a code one level up with spreading factor 128. However, this solution entails that the users are synchronized with each other, because the first user cannot use its own sibling code while the second user uses the parent code. The first user equipment can thus make measurements during the first half of a normal frame and receive a shortened frame spread with the parent code during the second half, in which case its data transmission capacity corresponds to a normal frame spread with the sibling code. The second user equipment receives a shortened frame spread with the parent code during the first half of the frame and makes measurements during the second half. In normal operation, both sets of user equipment receive normal frames spread with their own sibling codes. The required synchronization is a considerable limitation to the flexibility of the system.

BRIEF DESCRIPTION OF THE INVENTION

It is thus an object of the invention to develop a method and an apparatus implementing the method in a manner that solves the above problems. This object is achieved by a method described in the following. It is a method for transmitting data from a radio network subsystem over a radio link to user equipment in a mobile telephone system, which comprises: the radio network subsystem transmits a dedicated physical channel to the user equipment, which dedicated physical channel comprises a dedicated physical control channel and a dedicated physical data channel, and the dedicated physical channel is formed by frames to be transmitted to the radio link; during transmission, the radio network subsystem spreads each channel with a spreading code, the length of which spreading code, i.e. spreading factor, determines the data transmission rate, and a spreading code to be used in normal situations is reserved for the radio link. In the method in question, in a special situation at least one frame of the dedicated physical data channel is spread with a shared spreading code which is shorter than the spreading code used in normal situations, and the shared spreading code in question is shared by time division between the dedicated physical data channels of at least two different radio links.

A further object of the invention is a radio network subsystem which is adapted to transmit a dedicated physical channel over a radio link to the user equipment, which dedicated physical channel comprises a dedicated physical control channel and a dedicated physical data channel, and to form a dedicated physical channel from the frames to be transmitted to the radio link; to spread each channel with a spreading code during transmission, the length of which spreading code, i.e. spreading factor, determines the data transmission rate, and to reserve a spreading code to be used in normal situations for the radio link. The radio system is adapted to spread in a special situation at least one frame of the dedicated physical data channel with a shared spreading code which is shorter than the spreading code used in normal situations, and to share the shared spreading code in question by time division between the dedicated physical data channels of at least two different radio links.

A yet further object of the invention is user equipment which is adapted to receive a dedicated physical channel transmitted by the radio network subsystem over a radio link, which dedicated physical channel comprises a dedicated physical control channel and a dedicated physical data channel, and to form a dedicated physical channel from the frames to be received from the radio link; to remove during reception the spreading of each channel with a spreading code, the length of which spreading code, i.e. spreading factor, determines the data transmission rate, and to use in normal situations the spreading code reserved for the radio link for normal situations to remove the spreading. In special situations, the user equipment is adapted to remove the spreading of at least one frame of the dedicated physical data channel with a shared spreading code which is shorter than the spreading code used in normal situations and which is used by time division between the dedicated physical data channels of at least two different radio links.

The preferred embodiments of the invention are set forth in the dependent claims.

The invention is based on the fact that a common code resource distributed to different radio links is reserved for the spreading of dedicated physical data channels. In normal situations, each radio link uses its own code resource, but in special situations, a radio link can use the shared code resource. The individual code resource of a radio link and the shared code resource are in no way dependent on each other, i.e. they can be used simultaneously.

The method of the invention provides several advantages. The data transmission rate can be changed quickly, even specifically for each frame, by selecting a suitable spreading code. This enables an efficient utilization of radio resources.

BRIEF DESCRIPTION OF THE DRAWINGS

In the following, the invention will be described in greater detail in connection with preferred embodiments and with reference to the attached drawings, in which FIG. 3 shows the channels of a mobile telephone system set in frames, FIG. 4A shows a code tree, FIG. 4B illustrates the allocation of codes according to the invention.

DETAILED DESCRIPTION OF THE INVENTION

The invention can be used in various mobile telephone systems that use the code division multiple access method (CDMA). The examples illustrate the use of the invention in a universal mobile telephone system using a direct-sequence wide-band code division multiple access method, without limiting the invention to it, however. Thus, for instance the IMT-2000 mobile telephone system developed by ARIB (Association of Radio Industries and Businesses) in Japan is a system of the invention. The examples are based on the specification of the WCDMA system, further information on which is available in the ETSI (European Telecommunications Standards Institute) specification "The ETSI UMTS Terrestrial Radio Access (UTRA) ITU-R RTT Candidate Submission (Tdoc SMG2 260/98, May/June 1998), which is incorporated herein by reference.

The structure of a universal mobile telephone system is described with reference to FIGS. 1A and 1B. FIG. 1B includes only the blocks that are essential for describing the invention, but it is obvious to those skilled in the art that a common mobile telephone system also contains other functions and structures which need not be described in detail herein. The main parts of a mobile telephone system are a core network CN, a universal mobile telephone system (UMTS) terrestrial radio access network UTRAN, and user equipment UE. The interface between CN and UTRAN is referred to as Iu and the air interface between UTRAN and UE is referred to as Uu.

UTRAN comprises radio network subsystems RNS. The interface between RNSs is referred to as Iur. An RNS comprises a radio network controller RNC and one or more nodes B. The interface between RNC and B is referred to as Iub. The service area of node B, i.e. cell, is indicated with C in FIG. 1B.

Figure 1A:
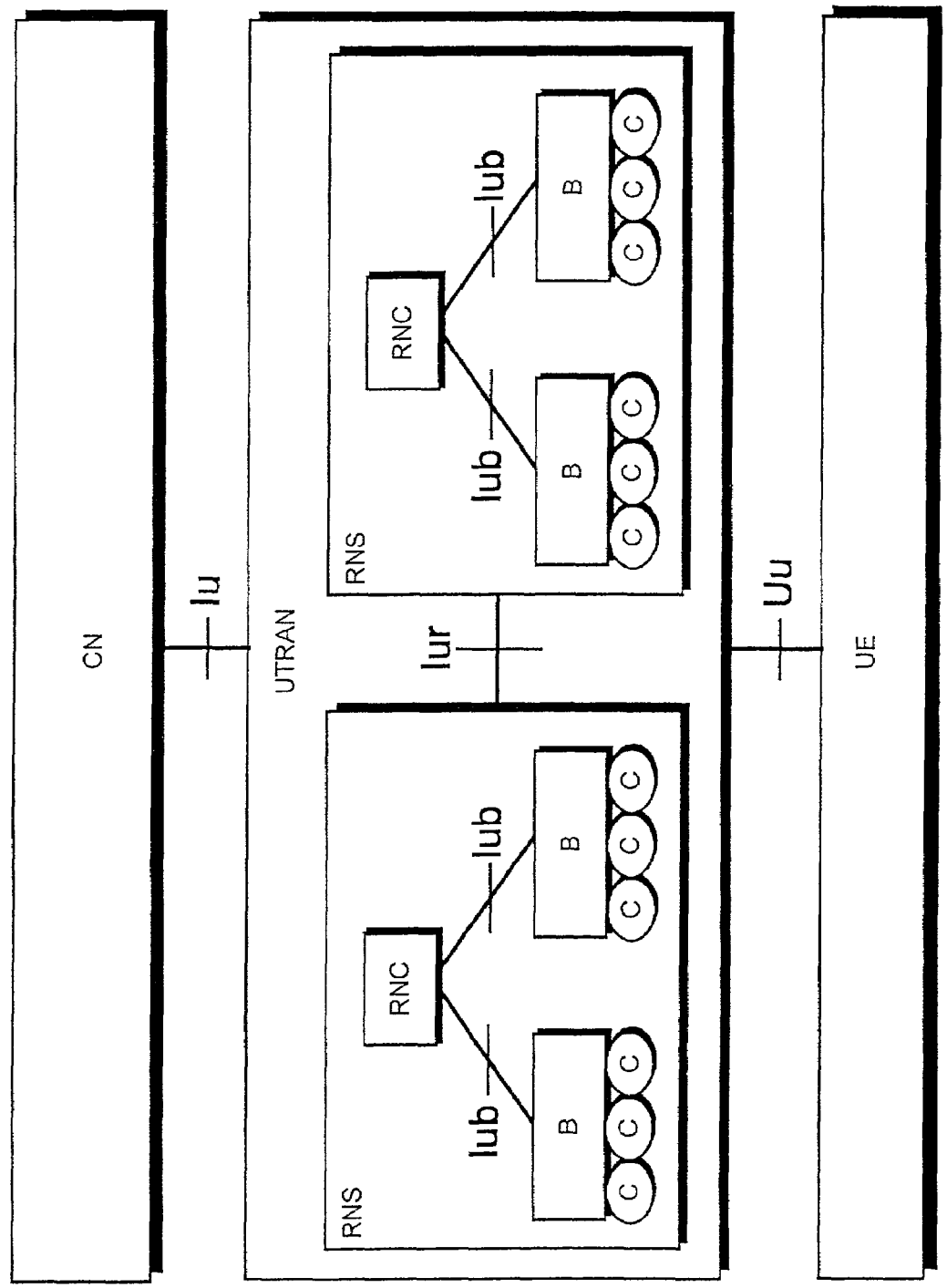
FIGS. 1A and 1B show a mobile telephone system.
Figure 1B:
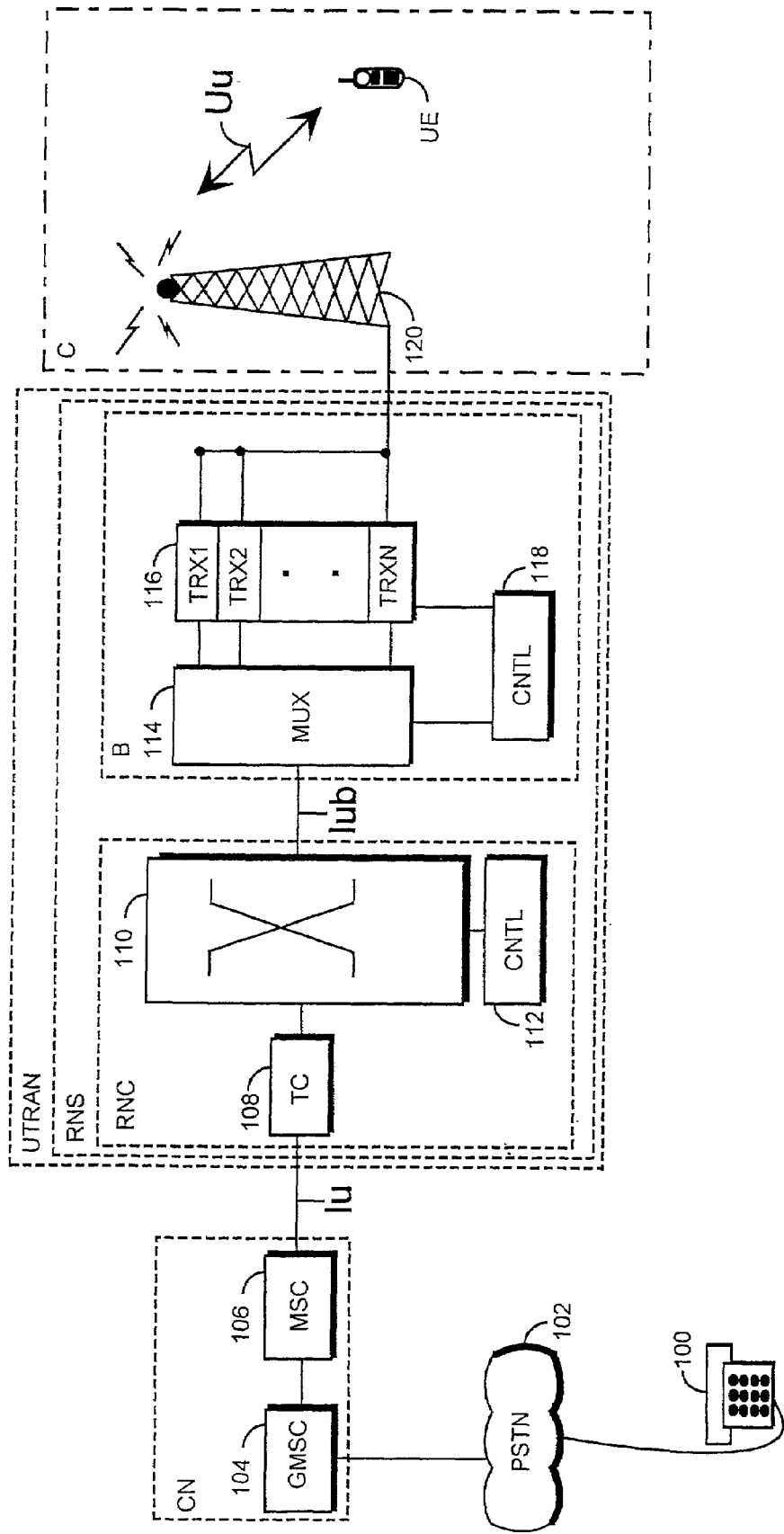

As the presentation in FIG. 1A is very abstract, it is therefore clarified in FIG. 1B by setting forth the parts of the GSM system that approximately correspond with the parts of the UMTS. It should be noted that the mapping shown is by no means a binding one but an approximation, since the responsibilities and functions of the different parts of the UMTS are still being planned.

As shown in FIG. 1B, a circuit-switched connection can be established from user equipment UE to a phone 100 in a public switched telephone network (PSTN) 102. The user equipment UE can, for instance, be a fixed terminal, a terminal arranged in a vehicle, or a portable terminal. The infrastructure of a radio network UTRAN comprises radio network subsystems RNS, i.e. base transceiver station systems. A radio network subsystem RNS comprises a radio-network controller RNC, i.e. a base station controller, and at least one node B, i.e. base transceiver station, under its control.

The base transceiver station B has a multiplexer 114, transceivers 116 and a control unit 118 which controls the operation of the transceivers 116 and the multiplexer 114. With the multiplexer 114, the traffic and control channels used by several transceivers 116 are placed in the transmission link Iub.

The transceivers 116 of the base transceiver station B are connected to an antenna unit 120 which implements a bi-directional radio link Uu to user equipment UE. The structure of the frames to be transmitted over the bi-directional radio link Uu is clearly specified.

The radio network controller RNC comprises a group switching field 110 and control unit 112. The group switching field 110 is used to connect speech and data and to connect signalling circuits. The base station system formed by the base transceiver station B and the radio network controller RNC also comprises a transcoder 108. Work distribution between the radio network controller RNC and the base transceiver station B as well as their physical structure can vary depending on implementation. Typically, the base transceiver station B takes care of the radio path implementation as described above. The radio network controller RNC typically takes care of the following: management of radio resources, control of handover between cells, power adjustment, timing and synchronization, paging the user equipment.

The transcoder 108 is usually located as close as possible to a mobile switching centre 106, because speech can then be transmitting in mobile telephone system format between the transcoder 108 and the radio network controller RNC saving transmission capacity. The transcoder 108 converts the different digital coding formats of speech used between the public switched telephone network and the mobile telephone network to be compatible with each other, for instance from the 64 kbits/s format of a public network to another (e.g. 13 kbits/s) format of a cellular network and vice versa. The hardware required is not described in detail herein, but it can be noted that other data than speech is not converted in transcoder 108. The control unit 112 takes care of call control, mobility management, collection of statistics, and signalling.

Core network CN comprises an infrastructure belonging to a mobile telephone system and external to UTRAN. FIG. 1B describes two of the components in a core network CN, i.e. a mobile switching centre 106 and a gateway mobile switching centre 104 which handles the connections of the mobile telephone system to the outside world, in this case, to the public switched telephone network 102.

Figure 5:
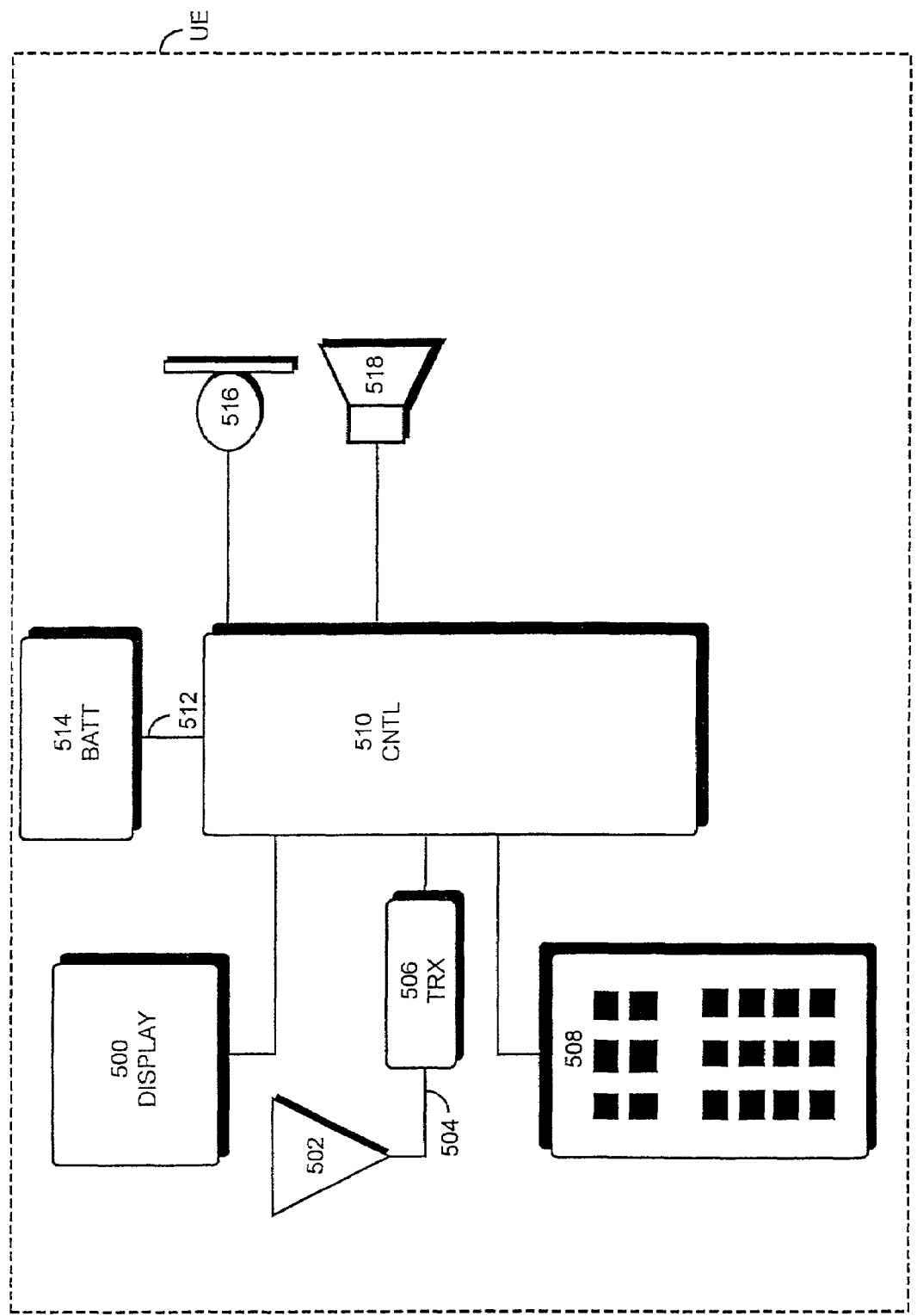
FIG. 5 shows user equipment.

FIG. 5 shows an example of the structure of user equipment UE. The essential parts of user equipment UE are: interface 504 to the antenna 502 of the user equipment, transceiver 506, control part 510 of the user equipment, and interface 512 to the battery 514. The user interface usually comprises a display 500, keyboard 508, microphone 516, and loudspeaker 518.

Figure 2A:
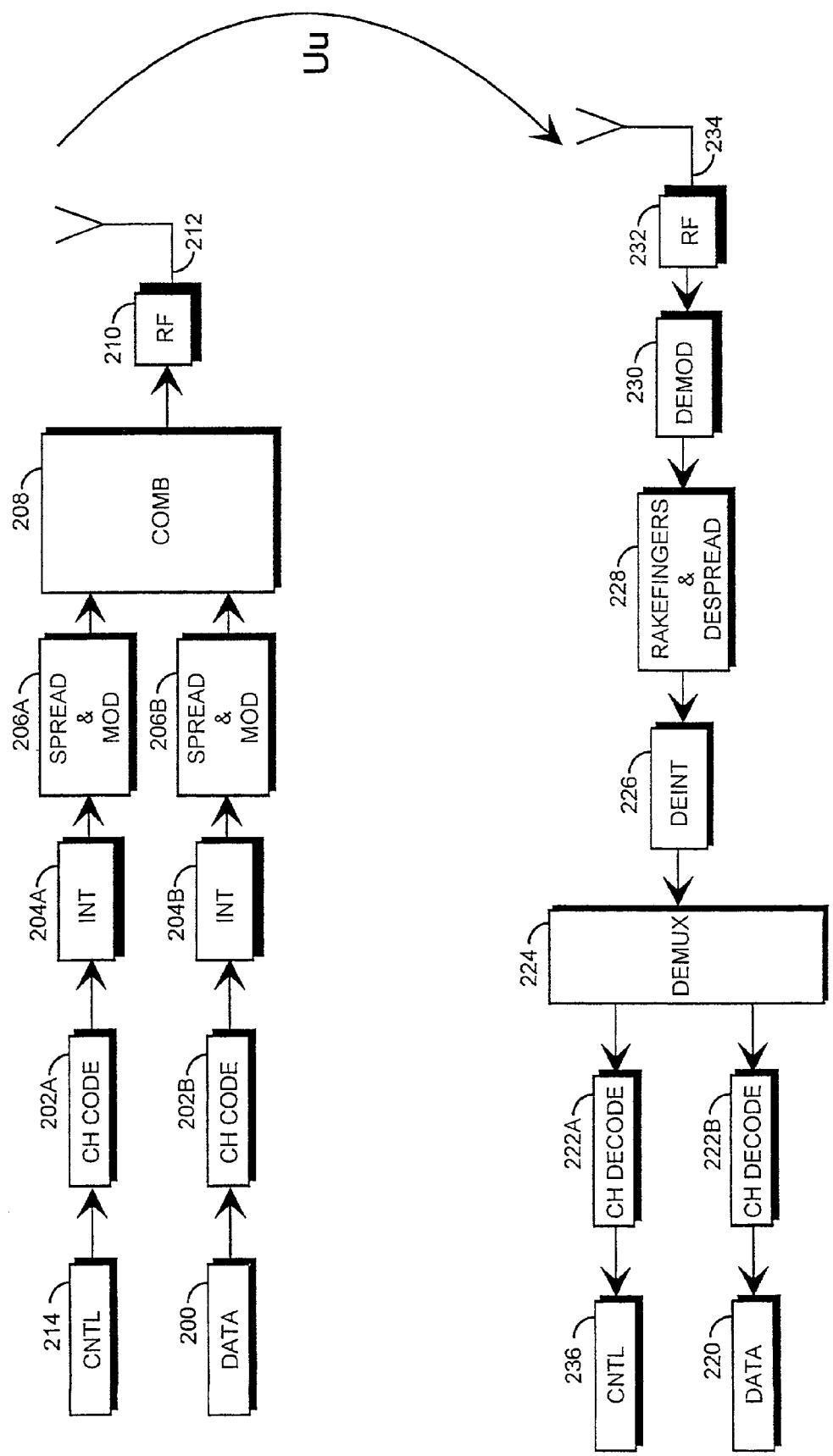
FIG. 2A shows a transmitter and receiver of a mobile telephone system.

FIG. 2A describes the operation of a radio transmitter—radio receiver pair. FIG. 2A describes a case of downlink where the radio transmitter is located in node B and the radio receiver in the user equipment UE.

The upper part of FIG. 2A describes the essential functions of the radio transmitter. Various services located in the physical channel include speech, data, moving or still video picture, and control channels of the system which are processed in the control part 214 of the radio transmitter. The figure shows the processing of the control channel and data. Different services require different source coding means, for instance speech requires a speech codec. For clarity's sake, source coding means are not, however, described in FIG. 2A.

Different channel coding is then performed for different channels in blocks 202A and 202B. Channel coding includes, for instance, different block codes, an example of which is cyclic redundancy check (CRC). In addition, convolution coding and its various modifications, such as punctured convolution coding or turbo coding, are typically used.

When the different channels have been channel-coded, they are interleaved in an interleaver 204A, 204B. The purpose of interleaving is to facilitate error correction. In interleaving, the bits of different services are mixed in a certain manner together, in which case a momentary fade in the radio path does not necessarily make the transmitted information unidentifiable. The interleaved bits are then spread with a spreading code, scrambled with a scrambling code and modulated in block 206A, 206B, the operation of which is described in greater detail in FIG. 2B. Individual signals are combined in block 208 to be transmitted through one transmitter.

Finally, the combined signal is forwarded to radio frequency parts 210 which can comprise different power amplifiers and filters restricting bandwidth. The analogous radio signal is then transmitted through an antenna 212 to radio path Uu.

The lower part of FIG. 2A describes the essential functions of the radio receiver. The radio receiver is typically a RAKE receiver. An analogous radio frequency signal is received from the radio path Uu with an antenna 234. The signal is forwarded to radio frequency parts 232 comprising a filter which prevents all frequencies outside the desired bandwidth. After this, the signal is converted in a demodulator 230 to an intermediate frequency or directly to a base band, and the thus converted signal is then sampled and quantized.

As the signal in question is a multipath propagated signal, the aim is to combine the signal components that propagated via different paths in block 228 which comprises several RAKE fingers of prior art. The signal components received at different time delays by the RAKE fingers are searched for by correlating the received signal with the spreading codes used and delayed by predefined time delays. When the time delays of the signal components have been found, the signal components belonging to the same signal are combined. At the same time, the spreading of the signal components is removed by multiplying the signal by the spreading code of the physical channel. The interleaving of the received physical channel is then removed in deinterleaving means 226.

The deinterleaved physical channel is then distributed to the data streams of various channels in a demultiplexer 224. The channels are directed each to its own channel decoding block 222A, 222B where the channel coding, for instance block coding or convolution coding, used in transmission is decoded. Convolution coding is preferably decoded with a Viterbi decoder. Each transmitted channel 220A, 220B can then be forwarded to a required further processing, for instance data 220 is forwarded to a computer 122 connected to the user equipment UE. The control channels of the system are forwarded to the control part 236 of the radio receiver.

Figure 2B:
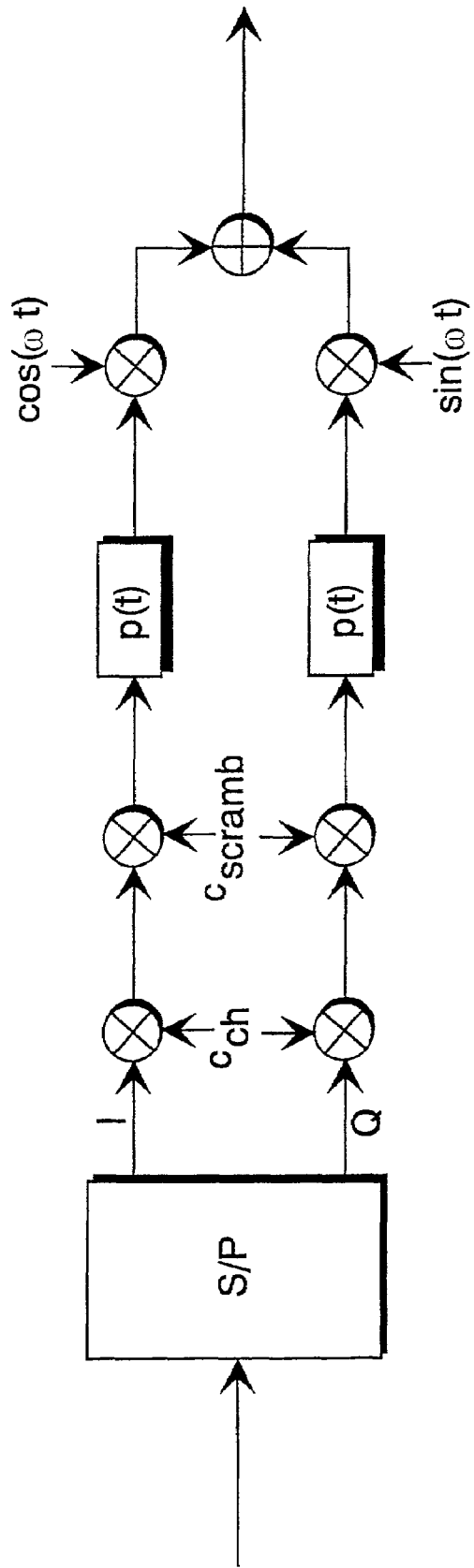
FIG. 2B illustrates the spreading and modulation performed in a transmitter.

FIG. 2B describes in greater detail the spreading of a channel with a spreading code and its modulation. In the figure, the bit stream of the channel arrives from the left to block S/P in which each two-bit sequence is converted from serial mode to parallel mode, i.e. one bit is forwarded to the I branch of the signal and the second bit to the Q branch. Then the I and Q branches of the signal are multiplied by the same spreading code $CC_{ch}$, in which case the relatively narrowband information is spread on a wide frequency band. Each link Uu has its own spreading code by which the receiver identifies transmissions meant for it. The signal is then scrambled by multiplying it by a scrambling code $C_{scramb}$ which is different for each transmitter. The pulse format of the obtained signal is filtered with a filter p(t). Finally, the signal is modulated to a radio frequency carrier by multiplying its different branches offset by 90 degrees from each other, the thus obtained branches are combined into one carrier which is ready to be transmitted to the radio path Uu apart from possible filtering and power amplifications. The described modulation method is QPSK (Quadrature Phase Shift Keying).

FIG. 4A describes different spreading codes. Each point 400 represents one possible spreading code. The vertical dashed lines illustrate different spreading factors SF=1, SF=2, SF=4, SF=8, SF=16, SF=32, SF=64, SF=128, SF=256. The codes on each vertical dashed line are mutually orthogonal. It is thus possible to simultaneously use at most two hundred and fifty six different mutually orthogonal spreading codes. For instance in UMTS, when using a five-megahertz carrier at 4.096 megachips per second, a spreading factor of SF=256 corresponds to a transmission rate of thirty two kilobits per second, and correspondingly the highest practical transmission rate is achieved with spreading factor SF=4, with which the data transmission rate is two thousand forty eight kilobits per second. The transmission rate in the channel varies thus step by step, 32, 64, 128, 256, 512, 1024, and 2048 kbit/s, while the spreading factor changes correspondingly, 256; 128, 64, 32, 16, 8, and 4. The data transmission rate available to the user depends on the channel coding used. For instance, when using ⅓ convolution coding, the data transmission rate of the user is approximately one third of the data transmission rate of the channel. The spreading factor indicates the length of the spreading code. For instance, the spreading code corresponding to spreading factor SF=1 is (1). Spreading factor SF=2 has two mutually orthogonal spreading codes (1,1) and (1,−1). Further, spreading code SF=4 has four mutually orthogonal spreading codes: under the higher-level spreading code (1,1), there are spreading codes (1,1,1,1) and (1,1,−1,−1), and under the second higher-level spreading code (1,−1), there are spreading codes (1,−1,1,−1) and (1,−1,−1,1). The formation of spreading codes is thus continued towards the lower levels of the code tree. The spreading codes of a certain level are always mutually orthogonal. Similarly, a spreading code of a certain level is orthogonal with all lower-level spreading codes derived from another spreading code on the same level.

With reference to FIG. 3, an example will be described as to what kind of frame structure can be used in a physical channel. Frames 340A, 340B, 340C, 340D are numbered sequentially from one to seventy two and they form a 720-millisecond long super frame. The length of one frame 340C is 10 milliseconds. Frame 340C is divided into sixteen slots 330A, 330B, 330C, 330D. The length of one slot 330C is 0.625 milliseconds. One slot 330C typically corresponds to one power adjustment period during which power is adjusted one decibel up or down, for instance.

Physical channels are divided into two different types: dedicated physical data channels (DPDCH) 310 and dedicated physical control channels (DPCCH) 312. Dedicated physical data channels 310 are used to transmit data 306 which is generated on the second layer and above of OSI (Open Systems Interconnection), i.e. closest to the dedicated traffic channels. Dedicated physical control channels 312 transmit control information generated on the first layer of OSI. Control information comprises pilot bits 300 used in channel estimation, transmit power control commands (TPC) 302, and optionally a transport format indicator (TFI) 304. The transport format indicator 304 indicates to the receiver the transmission rate used for each dedicated physical data channel of the uplink at a given time.

As shown in FIG. 3, the dedicated physical data channels 310 and the dedicated physical control channels 312 on the downlink are time-multiplexed to the same slot 330C. However, on the uplink, the channels in question are transmitted parallel so that they are IQ/code-multiplexed (I=in-phase, Q=quadrature) to each frame 340C and transmitted using dual-channel QPSK modulation (dual-channel quadrature phase-shift keying modulation). When additional dedicated physical data channels 310 need to be transmitted, they are code-multiplexed to the I or Q branch of the first channel pair.

If necessary, an associated control channel can be multiplexed to a dedicated physical data channel, in which associated control channel the control data of the second and higher layers is transmitted, e.g. update data on active sets and adjustment of signal/interference target of the outer power control loop. This multiplexing causes a problem with capacity as described in the beginning.

When using spreading factor SF=256, for instance, there are ten symbols available for use, i.e. twenty bits for slot 330C. This makes 320 bits per frame. The use of these bits is distributed as shown in table 1, for instance.

TABLE 1

| Content | Length |
| --- | --- |
| DPCCH: PILOT | 32 symbols = 64 bits |
| DPCCH: TPC | 8 symbols = 16 bits |
| DPCCH: TFI | 8 symbols = 16 bits |
| DPDCH: DATA | 112 symbols = 224 bits |

Thus there are 224 bits left for user data. For instance, to transmit speech data to a normal speech codec at eight kilobits per second, of the above bits are needed for data, 16 for cyclic redundancy check and 8 as tail bits, i.e. altogether 104 bits. The coding ratio obtained for the convolution coding to be used is 104/224=0.46, and this does not yet include the approximately twenty bits needed by the associated control channel. The convolution coding to be used is thus already worse than ½ convolution coding. In such a channel, it is difficult to transmit the bits needed by the associated control channel, because the amount of channel coding is quite small and because it is necessary to use puncturing, i.e. elimination coding.

The situation becomes even worse, if it is necessary to transmit speech data to an enhanced speech codec, i.e. at a rate of 12.2 kbit/s. Then the coding ratio is only 0.60 (=224 data bits+16 CRC bits+8 tail bits divided by 448).

Figure 6A:
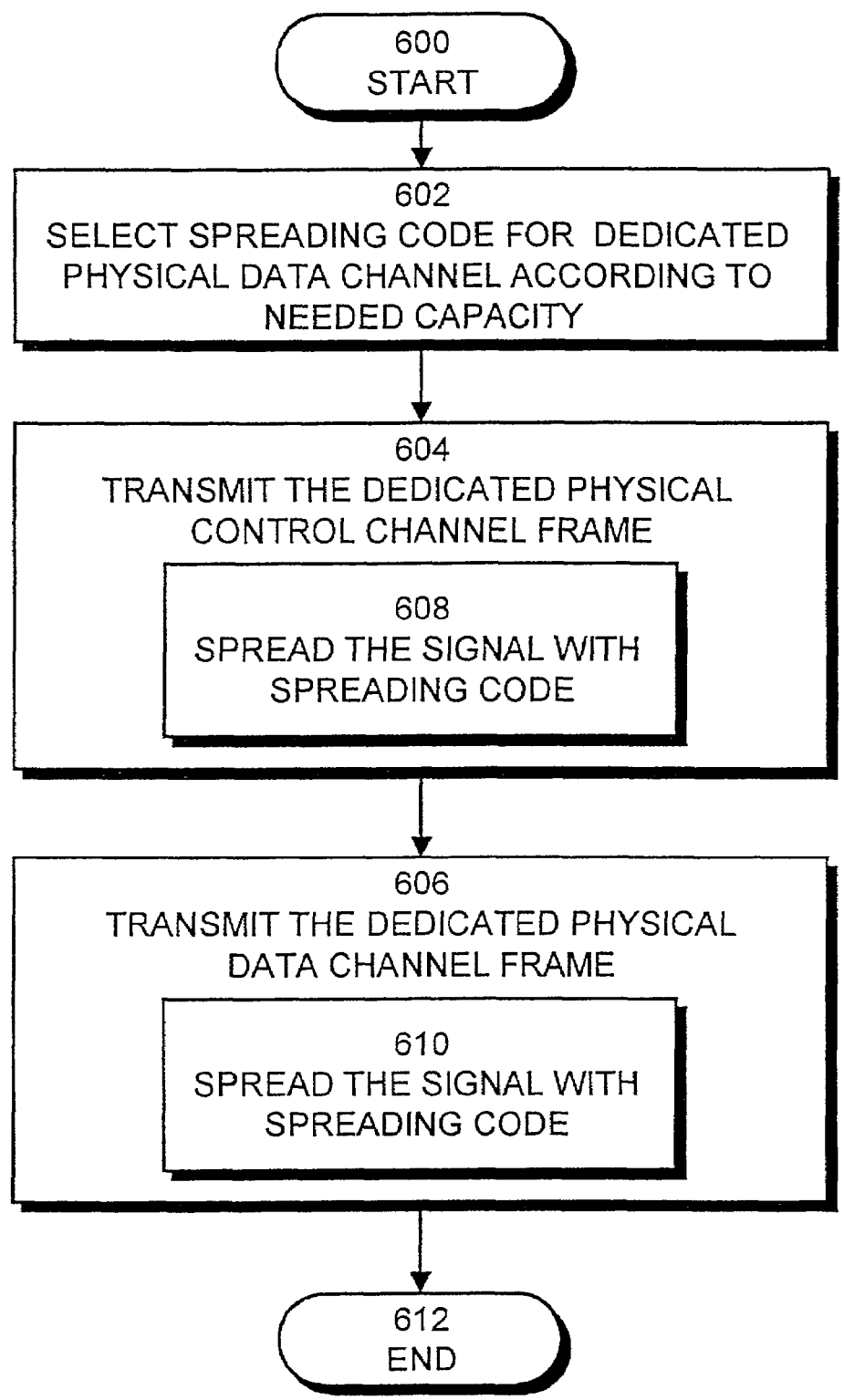
FIGS. 6A and 6B show flow charts illustrating action of the invention.
Figure 6B:
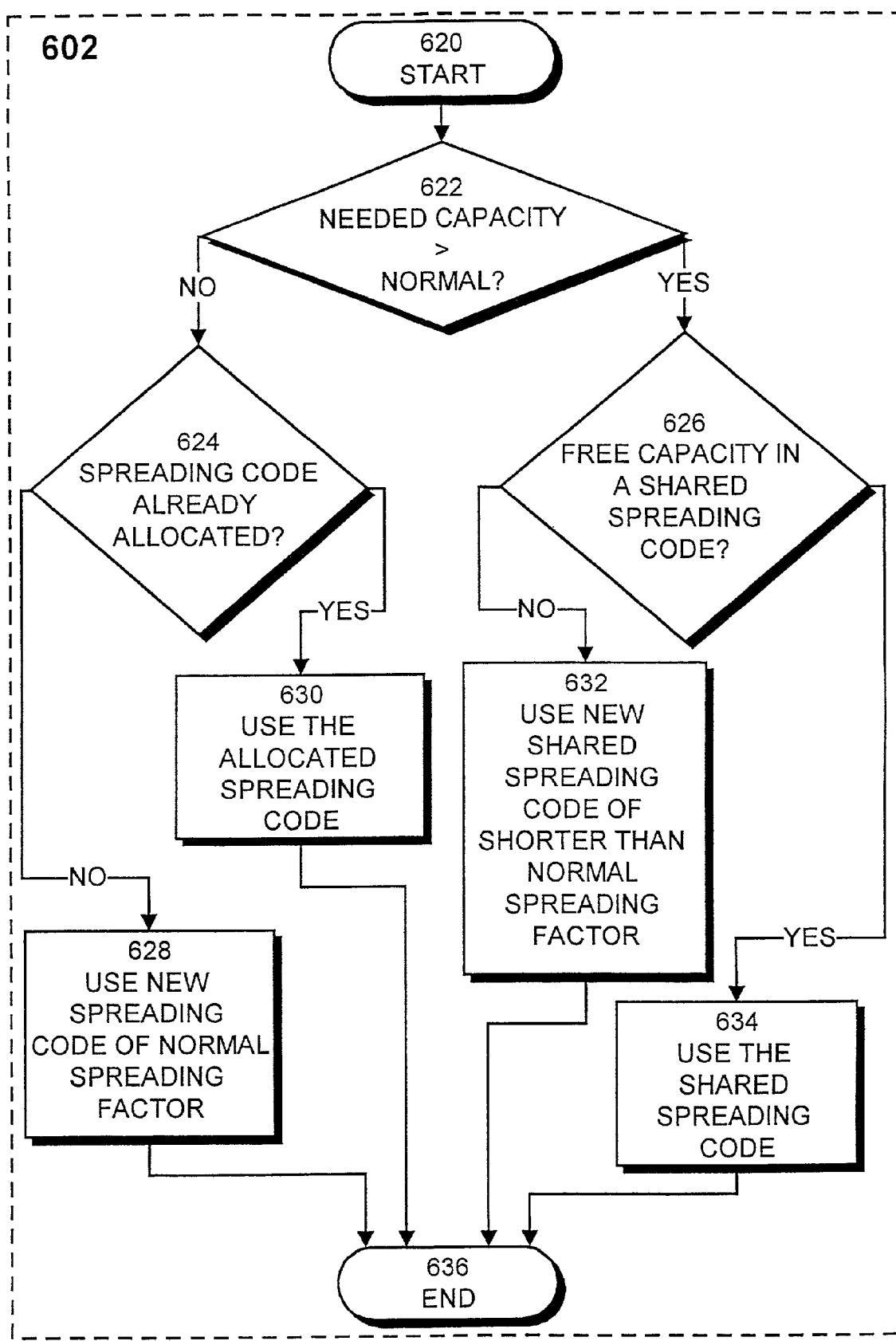

The method of the invention for transmitting data from the radio network subsystem RNS over the radio link Uu to the user equipment UE can be described with the flowcharts in FIGS. 6A and 6B. The execution of the method for an individual radio frame is started in block 600.

In blocks 604 and 606, the radio network subsystem RNS transmits a dedicated physical channel to the user equipment UE. As described above, the dedicated physical channel comprises a dedicated physical control channel and a dedicated physical data channel. As also described above, the dedicated physical channel is formed by frames to be transmitted to the radio link Uu.

In blocks 608 and 610, the radio network subsystem RNS spreads each channel with a spreading code during transmission. The length of the spreading code, i.e. spreading factor, determines the transmission rate, and a spreading code to be used in normal situation is reserved for the radio link Uu. The spreading factor of this normal spreading code can be 256, for instance.

Block 602 describes the basic idea of the invention, i.e. that in a special situation, at least one frame of a dedicated physical data channel is spread with a shared spreading code. The shared spreading code in question is shorter than the spreading code used in normal situations. In addition, the shared spreading code in question is shared by time division between the dedicated physical data channels of at least two different the radio links Uu. The spreading factor of the spreading code used in special situations can be 128, for instance.

FIG. 6B shows in greater detail the operation executed in block 602 of FIG. 6A. The execution of the sub-block is started from block 620. Then, in block 622, a check is made to see if this is a special situation, i.e. is more than the usual amount of data transmission capacity needed for the dedicated physical data channel. If the need for data transmission capacity is as usual, i.e. it can be satisfied with the spreading code used in normal situations, execution continues from block 624.

In block 624, a check is made to see if a normal spreading code has already been allocated to the radio link Uu in question. If a code has not been allocated, execution continues from block 628 where a code is allocated and it is used to spread the frame being processed. If a code has already been allocated, execution continues from block 630 where the allocated spreading code is used to spread the frame.

If the need for data transmission capacity was higher than usual in block 622, execution is continued from block 626. In block 626, a check is made to see if any one of the already allocated shared spreading codes has any free capacity. If none of the shared spreading codes have any free capacity, a new shared spreading code is selected in block 632 with a spreading factor smaller than that of the normally used spreading code, and the selected shared spreading code is used to spread the frame being processed. If one of the shared spreading codes has free capacity, the shared spreading code in question is used in block 634 to spread the frame being processed.

In the method, "normal situation" refers to a situation in which the spreading code allocated for the radio link can be used. Correspondingly, a "special situation" is one in which the data transmission capacity of the spreading code allocated for the radio link is not enough to transmit the required data. The spreading factor of a spreading code used in normal situations can be 256, for instance, and the spreading factor of a spreading code use in special situations 128, for instance. These numerical values are only examples, i.e. other kind of value combinations are also possible.

A special situation can be caused by the situation described above, in which an associated control channel is needed to be multiplexed to a dedicated physical data channel. Another example of a special situation is when the user equipment UE functions in slotted mode. In such a case, the user equipment UE measures the received power of other frequencies of adjacent base transceiver stations B for part of the duration of the radio frame transmitted normally by the radio network subsystem RNS. Such cells operating on different frequencies can occur in environments with both outdoor and indoor cells, for instance. Thus, the user equipment cannot receive the frame in question and the information it contains would be lost during normal operation. According to the invention, this is a special situation and during the rest of the duration of the frame, the radio network subsystem RNS transmits a shortened frame using a shared spreading code to spread it. Even though the frame is shortened, it can transmit the same quantity of data as in a normal frame thanks to the shared spreading code used. The data transmission capacity of a shared spreading code is higher than that of a normally used spreading code.

Let us then examine FIG. 4B which shows how codes can be reserved from the code tree in FIG. 4A to be used according to the method of the invention. It is assumed in FIG. 4B that the spreading factor of a spreading code used in normal situations is SF=256, and the spreading factor of a spreading code used in special situations is half of it, i.e. SF=128. The basic principle for sharing codes is that the spreading code reserved for the radio link Uu to be used in normal situations and the shared spreading code to be used in special situations reside on different levels and in different branches of the code tree. Generally, it can be said that if Y users share one spreading code, the spreading factor of which is SF=128, X spreading codes with spreading factor SF=256 remain for use:

$$X \div 2(X/Y) = 256 \quad (1)$$

X can be obtained from Formula 1:

$$X = 256/(1 \div 2/Y) \quad (2)$$

Formula 2 can then be used to calculate values of X by substituting Y with different figures:

If Y=4, then X=170, i.e. if four users share one shared spreading code with spreading factor 128, then 170 spreading codes with spreading factor 256 remain free.

If Y=6, then X=192, i.e. if six users share one shared spreading code with spreading factor 128, then 192 spreading codes with spreading factor 256 remain free.

If Y=8, then X=204, i.e. if eight users share one shared spreading code with spreading factor 128, then 204 spreading codes with spreading factor 256 remain free.

The example of FIG. 4B describes the middle alternative, i.e. it is assumed in the example that six radio links share the same shared spreading code.

FIG. 4B illustrates normal spreading codes by means of indexes, which start with SF=256, i.e. spreading codes SF=256, CODE1, SD=256, CODE2, etc. These codes reserve the first 96 of the codes of spreading level SF=128. The shared spreading codes shared between six users are thus codes of spreading level SF=128: SF=128, CODE97, SF=128, CODE 98, etc. Altogether 192 codes of spreading level SF=256 and 32 shared codes of spreading level SF=128 are thus in use.

With the method of the invention, it is thus possible to support the simultaneous use of as many as 192 orthogonal spreading codes, for instance to transmit speech or some other circuit-switched service, while fulfilling any requirements set by special situations. This provides a high increase of 50% in resources as opposed to prior art solutions in which only 128 orthogonal spreading codes can be simultaneously used without problems taking special situations into account.

Figure 7B:
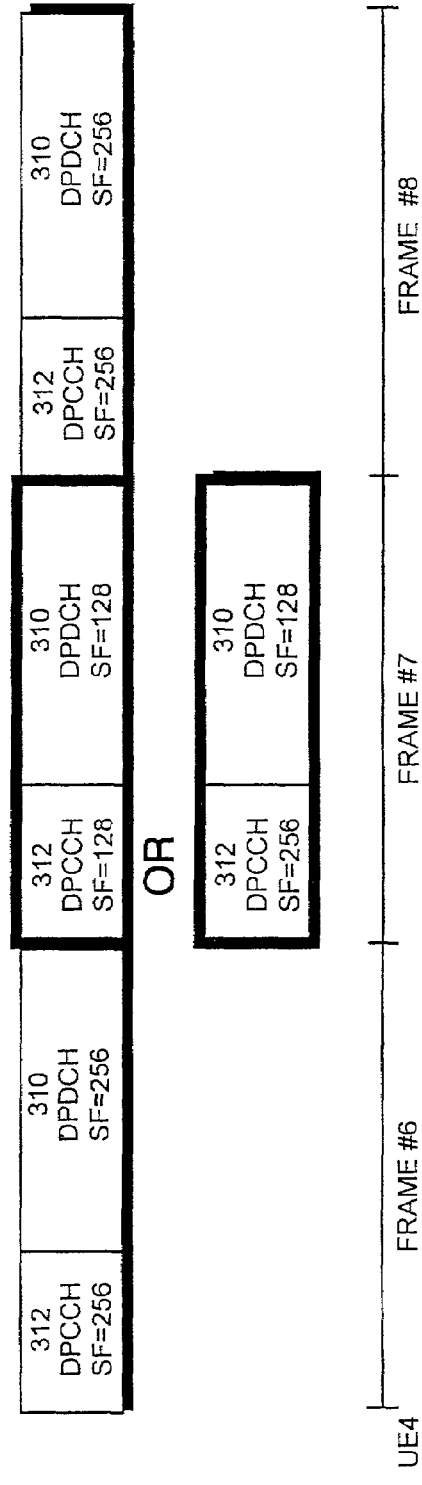
FIG. 7B shows an enlarged detail of FIG. 7A, which illustrates how different spreading codes can be used within a frame.
Figure 7A:
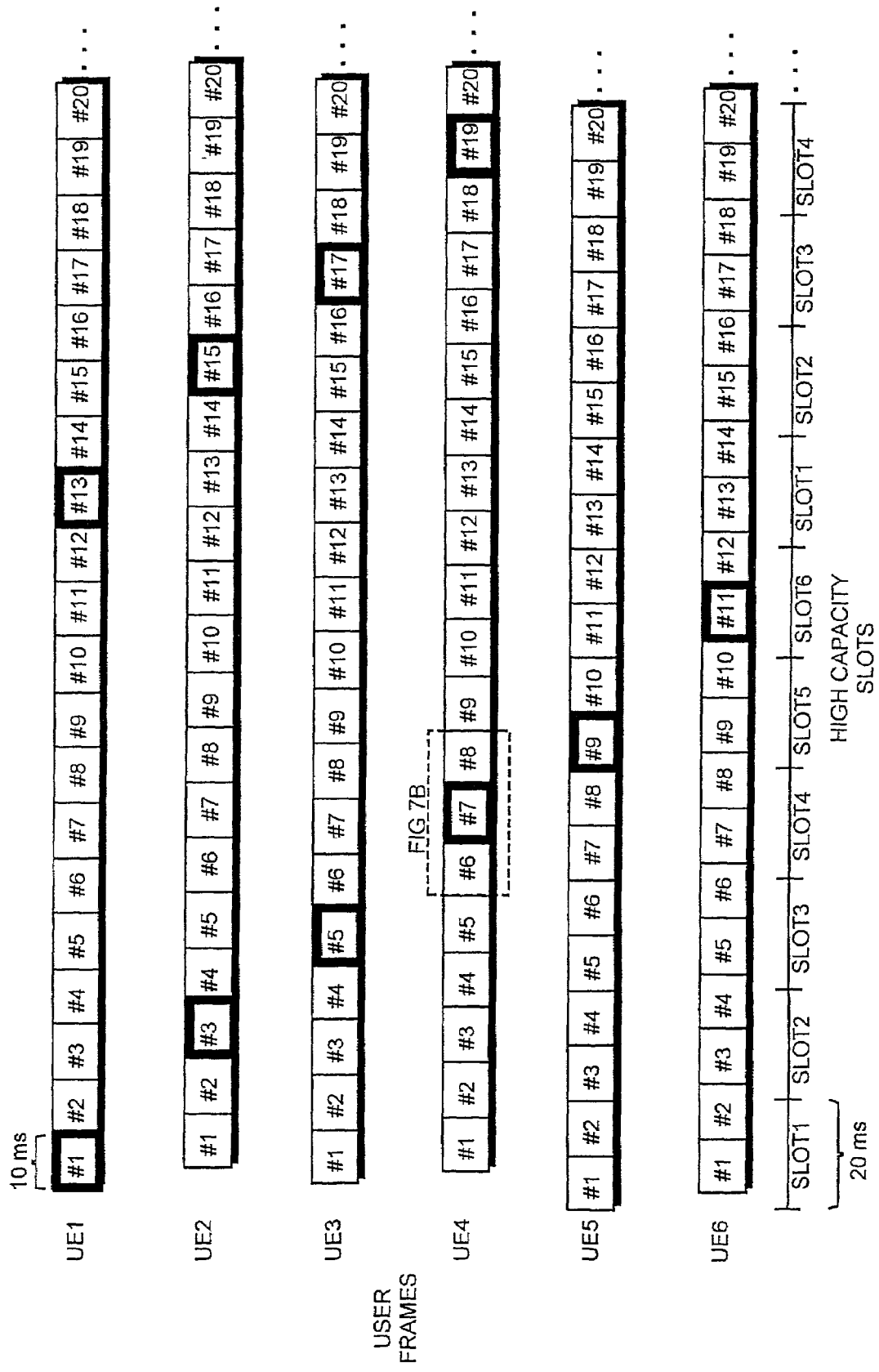
FIG. 7A illustrates sharing of the use of a spreading code according to the invention.

FIGS. 7A and 7B are examined next. They illustrate how the spreading codes described in the example in FIG. 4B are shared between radio links. In the example in FIG. 7A, it is assumed that the frames of different radio links are not synchronized, i.e. their transmission times have not been synchronized with each other to transmit the frames at the same moment of time. Therefore, the radio link Uu receives a shared spreading code for use for a time period which is twice the length of the frame to be transmitted to the radio link Uu. FIG. 7A shows in vertical direction the timing used for the radio links Uu of six user equipment UE1, UE2, UE3, UE4, UE5, UE6. The horizontal direction shows how ten-millisecond long radio frames numbered #1, #2, . . . , #72 are transmitted consecutively to each user equipment. The lowest line segment shows the time slots of high data transmission capacity SLOT1, SLOT2, . . . , SLOT6. One high data transmission slot is twice the length of a normal frame, i.e. twenty milliseconds. One after the other, each time slot now receives one high data transmission capacity slot for use. As six radio links share the spreading code of high data transmission capacity in question, each radio link can use the shared spreading code in question at hundred-millisecond intervals for twenty milliseconds at a time. In FIG. 7A, a black frame marks the time slots of the radio link of each user equipment during which the user equipment in question can use the shared spreading code. In other words, user equipment UE1, for instance, can always use the first time slot SLOT1 of the shared spreading code. In which of its ten-millisecond frames the user equipment UE1 can use the shared spreading code is entirely dependent on the timing of the user equipment in question. The user equipment UE1 transmits frames #1, #13 using the shared spreading code. Correspondingly, the user equipment UE4, for instance, uses the fourth time slot SLOT4 of the shared spreading code and sends frames #7, #19, #31, #43, #55, and #67, for instance, using the shared spreading code, if necessary.

FIG. 7B shows an enlarged detail of FIG. 7A outlined in FIG. 7A with a dashed line and marked with reference "FIG 7B". FIG. 7B illustrates how three frames FRAME #6, FRAME #7, and FRAME #8 of the fourth user equipment UE4 are spread. In the normally transmitted frames FRAME #6 and FRAME #9, both the dedicated physical control channel and the dedicated physical data channel are spread using the spreading code, the spreading factor of which is SF=256, allocated to the link for normal situations. According to the invention, the dedicated physical data channel of the frame FRAME #7 is spread using the shared spreading code, the spreading factor of which is SF=128. There are two different possibilities for spreading the dedicated physical control channel of the frame FRAME #7: either the same shared spreading code is used as for spreading the dedicated physical data channel, or the spreading code for normal situations is used.

The example in FIG. 7A illustrated a case in which frames of different radio links were not synchronized with each other. When the frames of different radio links Uu are synchronized with each other, each radio link Uu receives the shared spreading code for use for a time period which is the same length as the frame to be transmitted to the radio link Uu. In this case, each user equipment can use the shared spreading code at intervals of fifty milliseconds.

In a preferred embodiment, each radio link Uu receives the shared spreading code for use when necessary. In comparison with the example in FIG. 7A, in which each radio link Uu receives the shared spreading code for use as frames agreed in advance by the radio network subsystem RNS and the user equipment UE, this provides the advantage that the shared code resource is not kept reserved in vain, but the disadvantage in this is that more signalling is required.

In a preferred embodiment, the dedicated physical control channel comprises a transport format indicator TFI which indicates the spreading code used to spread the dedicated physical data channel. This can be implemented in at least two different ways: 1) the transport format indicator in the received physical frame indicates the spreading code used to spread the dedicated physical data channel in the received frame, 2) the transport format indicator in the physical frame preceding the received physical frame indicates the spreading code used to spread the dedicated physical data channel in the received frame. In alternative 1, the signalling does not have a delay of ten milliseconds as is the case in alternative 2. On the other hand, alternative 2 does not require duplication of the parts removing the spreading in the receiver as is the case in alternative 1.

The method of the invention can also be used in a situation where the user equipment UE is performing a soft handover. In a soft handover, at least two different base transceiver stations B transmit to the user equipment UE a dedicated physical data channel using a shared spreading code of equal length for spreading so that the user equipment UE receives the transmissions in question substantially at the same moment. The shared spreading code used is selected independently for each base transceiver station B, i.e. it does not have to be the same as long as the length of the spreading code used is the same, i.e. they have the same spreading factor. Timing need not be the same and it is, in practice, enough that for instance the symbols transmitted via different radio paths to the user equipment UE overlap partly. For example, when using a five-megahertz carrier at 4.096 megachips per second, it is possible to send 160 symbols per one ten-millisecond frame channel-coded with a spreading code, the spreading factor of which is 256. Thus, the chips of symbols corresponding to each other need not be exactly on top of each other, but an offset of 50 to 100 chips, for instance, is allowed. The offset can also be larger, but then the processing required is more complex.

The invention is preferably implemented by means of software. The processing required in the radio network subsystem necessitates changes in the protocol processing software and in the control of transmitter operation, in particular the processing of spreading codes. Correspondingly, it is necessary to make changes in the protocol processing software and in the control of receiver operation, in particular the processing of spreading codes, of the user equipment.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for transmitting data from a radio network subsystem over a radio link to user equipment in a mobile telephone system, the method comprising:
   the radio network subsystem transmitting a dedicated physical channel to the user equipment, which dedicated physical channel includes a dedicated physical control channel and a dedicated physical data channel, the dedicated physical channel being formed by frames to be transmitted to the radio link;
   during transmission, the radio network subsystem spreading each channel with a spreading code, the spreading factor of that spreading code determining the data transmission rate, a spreading code to be used in normal situations being reserved for the radio link; and
   in a special situation, spreading at least one frame of the dedicated physical data channel with a shared spreading code, which shared spreading code being shorter than the spreading code used in normal situations,
   wherein the shared spreading code is shared by time division between the dedicated physical data channels of at least two different radio links and, wherein, in special situations, the user equipment functions in slotted mode, in which the user equipment measures the received power of other frequencies of adjacent base transceiver stations for part of the duration of the frame transmitted normally by the radio network subsystem, and during the rest of the duration of the frame, the radio network subsystem transmits a shortened frame using a shared spreading code to spread the shortened frame.

2. A method for transmitting data from a radio network subsystem over a radio link to user equipment in a mobile telephone system, the method comprising:
   the radio network subsystem transmitting a dedicated physical channel to the user equipment, which dedicated physical channel includes a dedicated physical control channel and a dedicated physical data channel, the dedicated physical channel being formed by frames to be transmitted to the radio link;
   during transmission, the radio network subsystem spreading each channel with a spreading code, the spreading factor of that spreading code determining the data transmission rate, a spreading code to be used in normal situations being reserved for the radio link; and
   in a special situation, spreading at least one frame of the dedicated physical data channel with a shared spreading code, which shared spreading code being shorter than the spreading code used in normal situations, wherein the shared spreading code is shared by time division between the dedicated physical data channels of at least two different radio links, and, wherein, when the frames of different radio links are not synchronized with each other, each radio link receives a shared spreading code for use for a time period which is twice the length of the frame to be transmitted to the radio link.

3. A method for transmitting data from a radio network subsystem over a radio link to user equipment in a mobile telephone system, the method comprising:

the radio network subsystem transmitting a dedicated physical channel to the user equipment, which dedicated physical channel includes a dedicated physical control channel and a dedicated physical data channel, the dedicated physical channel being formed by frames to be transmitted to the radio link;

during transmission, the radio network subsystem spreading each channel with a spreading code, the spreading factor of that spreading code determining the data transmission rate, a spreading code to be used in normal situations being reserved for the radio link; and in a special situation, spreading at least one frame of the dedicated physical data channel with a shared spreading code, which shared spreading code being shorter than the spreading code used in normal situations, wherein the shared spreading code is shared by time division between the dedicated physical data channels of at least two different radio links, wherein the dedicated physical control channel includes a transport format indicator which indicates the spreading code used to spread the dedicated physical data channel, and the transport format indicator in the received physical frame indicates the spreading code used to spread the dedicated physical data channel in the received frame.

4. A method for transmitting data from a radio network subsystem over a radio link to user equipment in a mobile telephone system, the method comprising:

the radio network subsystem transmitting a dedicated physical channel to the user equipment, which dedicated physical channel includes a dedicated physical control channel and a dedicated physical data channel, the dedicated physical channel being formed by frames to be transmitted to the radio link;

during transmission, the radio network subsystem spreading each channel with a spreading code, the spreading factor of that spreading code determining the data transmission rate, a spreading code to be used in normal situations being reserved for the radio link; and in a special situation, spreading at least one frame of the dedicated physical data channel with a shared spreading code, which shared spreading code being shorter than the spreading code used in normal situations, wherein the shared spreading code is shared by time division between the dedicated physical data channels of at least two different radio links, wherein the dedicated physical control channel includes a transport format indicator which indicates the spreading code used to spread the dedicated physical data channel, and the transport format indicator in the physical frame preceding the received physical frame indicates the spreading code used to spread the dedicated physical data channel in the received frame.

5. A method for transmitting data from a radio network subsystem over a radio link to user equipment in a mobile telephone system, the method comprising:

the radio network subsystem transmitting a dedicated physical channel to the user equipment, which dedicated physical channel includes a dedicated physical control channel and a dedicated physical data channel, the dedicated physical channel being formed by frames to be transmitted to the radio link;

during transmission, the radio network subsystem spreading each channel with a spreading code, the spreading factor of that spreading code determining the data transmission rate, a spreading code to be used in normal situations being reserved for the radio link; and in a special situation, spreading at least one frame of the dedicated physical data channel with a shared spreading code, which shared spreading code being shorter than the spreading code used in normal situations, wherein the shared spreading code is shared by time division between the dedicated physical data channels of at least two different radio links, and, wherein the spreading codes are arranged into a code tree in such a manner that the first level of the code tree root comprises a one-bit spreading code, the second level comprises two branches with mutually orthogonal two-bit spreading codes, the third level comprises four branches with mutually orthogonal four-bit spreading codes, the fourth level comprises eight branches with mutually orthogonal eight-bit spreading codes, the fifth level comprises sixteen branches with mutually orthogonal sixteen-bit spreading codes, the sixth level comprises thirty two branches with mutually orthogonal thirty-two-bit spreading codes, the seventh level comprises sixty four branches with mutually orthogonal sixty-four-bit spreading codes, the eighth level comprises one hundred and twenty eight branches with mutually orthogonal 128-bit spreading codes, the ninth level comprises two hundred and fifty six branches with mutually orthogonal 256-bit spreading codes, and an unambiguous method to refer to a spreading code has been agreed on by the radio network subsystem and the user equipment.

6. The method of claim 5, wherein the transmission rate is altered by changing the length of the spreading code used to spread a frame by moving from one level to another in the code tree.

7. The method of claim 5, wherein the spreading code reserved for the radio link to be used in normal situations and the shared spreading code to be used in special situations reside on different levels and in different branches of the code tree.

8. A radio network subsystem which is adapted to:

transmit a dedicated physical channel over a radio link to user equipment, the dedicated physical channel including a dedicated physical control channel and a dedicated physical data channel, the dedicated physical channel being formed from the frames to be transmitted to the radio link;

spread each channel with a spreading code during transmission, the spreading factor of the spreading code determining the data transmission rate, a spreading code to be used in normal situations for the radio link being reserved; and spread, in a special situation, at least one frame of the dedicated physical data channel with a shared spreading code which is shorter than the spreading code used in normal situations, and to share the shared spreading code in question by time division between the dedicated physical data channels of at least two different radio links, wherein in special situations, the user equipment functions in slotted mode, in which the user equipment measures the received power of other frequencies of adjacent base transceiver stations for part of the duration of the frame transmitted normally by the radio network subsystem, and during the rest of the duration of the frame, the radio network subsystem is adapted to transmit a shortened frame using a shared spreading code to spread the shortened frame.

9. A radio network subsystem which is adapted to:

transmit a dedicated physical channel over a radio link to user equipment, the dedicated physical channel including a dedicated physical control channel and a dedicated physical data channel, the dedicated physical channel being formed from the frames to be transmitted to the radio link;

spread each channel with a spreading code during transmission, the spreading factor of the spreading code determining the data transmission rate, a spreading code to be used in normal situations for the radio link being reserved; and spread, in a special situation, at least one frame of the dedicated physical data channel with a shared spreading code which is shorter than the spreading code used in normal situations, and to share the shared spreading code in question by time division between the dedicated physical data channels of at least two different radio links, wherein when the frames of different radio links are not synchronized with each other, the radio network subsystem is adapted to provide each radio link with a shared spreading code for use for a time period which is twice the length of the frame to be transmitted to the radio link.

10. A radio network subsystem which is adapted to:

transmit a dedicated physical channel over a radio link to user equipment, the dedicated physical channel including a dedicated physical control channel and a dedicated physical data channel, the dedicated physical channel being formed from the frames to be transmitted to the radio link;

spread each channel with a spreading code during transmission, the spreading factor of the spreading code determining the data transmission rate, a spreading code to be used in normal situations for the radio link being reserved;

spread, in a special situation, at least one frame of the dedicated physical data channel with a shared spreading code which is shorter than the spreading code used in normal situations, and to share the shared spreading code in question by time division between the dedicated physical data channels of at least two different radio links;

place into the dedicated physical control channel a transport format indicator which indicates the spreading code used to spread the dedicated physical data channel; and place into the transport format indicator of the physical frame to be transmitted the identification data of the spreading code used to spread the dedicated physical data channel in the frame to be transmitted.

11. A radio network subsystem which is adapted to:

transmit a dedicated physical channel over a radio link to user equipment, the dedicated physical channel including a dedicated physical control channel and a dedicated physical data channel, the dedicated physical channel being formed from the frames to be transmitted to the radio link;

spread each channel with a spreading code during transmission, the spreading factor of the spreading code determining the data transmission rate, a spreading code to be used in normal situations for the radio link being reserved;

spread, in a special situation, at least one frame of the dedicated physical data channel with a shared spreading code which is shorter than the spreading code used in normal situations, and to share the shared spreading code in question by time division between the dedicated physical data channels of at least two different radio links;

place into the dedicated physical control channel a transport format indicator which indicates the spreading code used to spread the dedicated physical data channel; and place into the transport format indicator of the physical frame preceding the physical frame to be transmitted the identification data of the spreading code used to spread the dedicated physical data channel in the frame to be transmitted.

12. A radio network subsystem which is adapted to:

transmit a dedicated physical channel over a radio link to user equipment, the dedicated physical channel including a dedicated physical control channel and a dedicated physical data channel, the dedicated physical channel being formed from the frames to be transmitted to the radio link;

spread each channel with a spreading code during transmission, the spreading factor of the spreading code determining the data transmission rate, a spreading code to be used in normal situations for the radio link being reserved; and spread, in a special situation, at least one frame of the dedicated physical data channel with a shared spreading code which is shorter than the spreading code used in normal situations, and to share the shared spreading code in question by time division between the dedicated physical data channels of at least two different radio links, wherein the spreading codes are arranged into a code tree in such a manner that the first level of the code tree root comprises a one-bit spreading code, the second level comprises two branches with mutually orthogonal two-bit spreading codes, the third level comprises four branches with mutually orthogonal four-bit spreading codes, the fourth level comprises eight branches with mutually orthogonal eight-bit spreading codes, the fifth level comprises sixteen branches with mutually orthogonal sixteen-bit spreading codes, the sixth level comprises thirty two branches with mutually orthogonal thirty-two-bit spreading codes, the seventh level comprises sixty four branches with mutually orthogonal sixty-four-bit spreading codes, the eighth level comprises one hundred and twenty eight branches with mutually orthogonal 128-bit spreading codes, the ninth level comprises two hundred and fifty six branches with mutually orthogonal 256-bit spreading codes, and an unambiguous method to refer to a spreading code has been agreed on by the radio network subsystem and the user equipment.

13. The radio network subsystem of claim 12, wherein the radio network subsystem is adapted to alter the transmission rate by changing the length of the spreading code used to spread a frame by moving from one level to another in the code tree.

14. The radio network subsystem of claim 12, wherein the radio network subsystem is adapted to reserve for the radio link from different levels and branches of the code tree a spreading code for use in normal situations and a shared spreading code for special situations.

15. User equipment which is adapted to:
receive a dedicated physical channel transmitted by the radio network subsystem over a radio link, which dedicated physical channel includes a dedicated physical control channel and a dedicated physical data channel, the dedicated physical channel being formed from the frames to be received from the radio link;
remove during reception the spreading of each channel with a spreading code, the spreading factor of the spreading code determining the data transmission rate, and, in normal situations, the spreading code reserved for the radio link being used remove the spreading,
in special situations, remove the spreading of at least one frame of the dedicated physical data channel with a shared spreading code which is shorter than the spreading code used in normal situations and which is used by time division between the dedicated physical data channels of at least two different radio links; and
function in slotted mode, in which the user equipment measures the received power of other frequencies of adjacent base transceiver stations for part of the duration of the frame transmitted normally by the radio network subsystem, and during the rest of the duration of the frame, the user equipment is adapted to receive a shortened frame transmitted by the radio network subsystem, and to use the shared spreading code to remove the spreading of the shortened frame in question.

16. User equipment which is adapted to:
receive a dedicated physical channel transmitted by the radio network subsystem over a radio link, which dedicated physical channel includes a dedicated physical control channel and a dedicated physical data channel, the dedicated physical channel being formed from the frames to be received from the radio link;
remove during reception the spreading of each channel with a spreading code, the spreading factor of the spreading code determining the data transmission rate, and, in normal situations, the spreading code reserved for the radio link being used remove the spreading, and
in special situations, remove the spreading of at least one frame of the dedicated physical data channel with a shared spreading code which is shorter than the spreading code used in normal situations and which is used by time division between the dedicated physical data channels of at least two different radio links,
wherein when the frames of different radio links are not synchronized with each other, the user equipment is adapted to receive a shared spreading code for use for a time period which is twice the length of the frame to be received from the radio link.

17. User equipment which is adapted to:
receive a dedicated physical channel transmitted by the radio network subsystem over a radio link, which dedicated physical channel includes a dedicated physical control channel and a dedicated physical data channel, the dedicated physical channel being formed from the frames to be received from the radio link;
remove during reception the spreading of each channel with a spreading code, the spreading factor of the spreading code determining the data transmission rate, and, in normal situations, the spreading code reserved for the radio link being used remove the spreading,
in special situations, remove the spreading of at least one frame of the dedicated physical data channel with a shared spreading code which is shorter than the spreading code used in normal situations and which is used by time division between the dedicated physical data channels of at least two different radio links;
read the spreading code used to spread the dedicated physical data channel from the transport format indicator in the dedicated physical control channel; and
read the identification data of the spreading code used to spread the dedicated physical data channel in the received frame from the transport format indicator in the received physical frame.

18. User equipment which is adapted to:
receive a dedicated physical channel transmitted by the radio network subsystem over a radio link, which dedicated physical channel includes a dedicated physical control channel and a dedicated physical data channel, the dedicated physical channel being formed from the frames to be received from the radio link;
remove during reception the spreading of each channel with a spreading code, the spreading factor of the spreading code determining the data transmission rate, and, in normal situations, the spreading code reserved for the radio link being used remove the spreading,
in special situations, remove the spreading of at least one frame of the dedicated physical data channel with a shared spreading code which is shorter than the spreading code used in normal situations and which is used by time division between the dedicated physical data channels of at least two different radio links;
read the spreading code used to spread the dedicated physical data channel from the transport format indicator in the dedicated physical control channel; and
read the identification data of the spreading code used to spread the dedicated physical data channel in the received frame from the transport format indicator in the physical frame preceding the received physical frame.

19. User equipment which is adapted to:
receive a dedicated physical channel transmitted by the radio network subsystem over a radio link, which dedicated physical channel includes a dedicated physical control channel and a dedicated physical data channel, the dedicated physical channel being formed from the frames to be received from the radio link;
remove during reception the spreading of each channel with a spreading code, the spreading factor of the spreading code determining the data transmission rate, and, in normal situations, the spreading code reserved for the radio link being used remove the spreading, and
in special situations, remove the spreading of at least one frame of the dedicated physical data channel with a shared spreading code which is shorter than the spreading code used in normal situations and which is used by time division between the dedicated physical data channels of at least two different radio links,
wherein the spreading codes are arranged into a code tree-in such a manner that the first level of the code tree root comprises a one-bit spreading code, the second level comprises two branches with mutually orthogonal two-bit spreading codes, the third level comprises four branches with mutually orthogonal four-bit spreading codes, the fourth level comprises eight branches with mutually orthogonal eight-bit spreading codes, the fifth level comprises sixteen branches with mutually orthogonal sixteen-bit spreading codes, the sixth level comprises thirty two branches with mutually orthogonal thirty-two-bit spreading codes, the seventh level comprises sixty four branches with mutually orthogonal sixty-four-bit spreading codes, the eighth level comprises one hundred and twenty eight branches with mutually orthogonal 128-bit spreading codes, the ninth level comprises two hundred and fifty six branches with mutually orthogonal 256-bit spreading codes, and an unambiguous method to refer to a spreading code has been agreed on by the radio network subsystem and the user equipment.

* * * * *